United States Patent
Park (10) Patent No.: US 12,106,110 B2
(45) Date of Patent: Oct. 1, 2024

(54) MULTIPLE INTERFACES FOR MULTIPLE THREADS OF A HARDWARE MULTI-THREAD MICROPROCESSOR

(71) Applicant: Ceremorphic, Inc., San Jose, CA (US)

(72) Inventor: Heonchul Park, Pleasanton, CA (US)

(73) Assignee: Ceremorphic, Inc., San Jose, CA (US)

( * ) Notice: Subject to any disclaimer, the term of this patent is extended or adjusted under 35 U.S.C. 154(b) by 0 days.

(21) Appl. No.: 17/463,535

(22) Filed: Aug. 31, 2021

(65) Prior Publication Data
US 2023/0066662 A1     Mar. 2, 2023

(51) Int. Cl.
*G06F 9/38*     (2018.01)
*G06F 1/04*     (2006.01)
*G06F 12/0875*     (2016.01)

(52) U.S. Cl.
CPC ............ *G06F 9/3802* (2013.01); *G06F 1/04* (2013.01); *G06F 9/3851* (2013.01); *G06F 9/3861* (2013.01); *G06F 12/0875* (2013.01); *G06F 2212/452* (2013.01)

(58) Field of Classification Search
CPC .... G06F 9/3802; G06F 9/3814; G06F 9/3851; G06F 9/3861; G06F 12/0811; G06F 12/0844; G06F 12/0853; G06F 12/0846; G06F 12/0848; G06F 12/0851; G06F 12/0855; G06F 12/0857; G06F 12/0875
See application file for complete search history.

(56) References Cited

U.S. PATENT DOCUMENTS

| | | | | |
|---|---|---|---|---|
| 6,167,510 A | * | 12/2000 | Tran | G06F 9/3802 |
| | | | | 711/E12.047 |
| 6,898,694 B2 | * | 5/2005 | Kottapalli | G06F 9/3851 |
| | | | | 712/E9.055 |
| 7,434,000 B1 | * | 10/2008 | Barreh | G06F 12/0859 |
| | | | | 718/107 |
| 9,396,117 B2 | * | 7/2016 | Aggarwal | G06F 12/0864 |
| 2003/0005262 A1 | | 1/2003 | Kottapalli et al. | |
| 2005/0044319 A1 | * | 2/2005 | Olukotun | G06F 9/30032 |
| | | | | 712/E9.034 |

(Continued)

OTHER PUBLICATIONS

Schnonherr et al, "Multi-thread implementations of the lattice Boltzmann method on non-uniform grids for CPUs and GPUs", Computers and Mathematics with Applications 61.12 (2011): 3730-3743.

*Primary Examiner* — Andrew Caldwell
*Assistant Examiner* — Kasim Alli
(74) *Attorney, Agent, or Firm* — File-EE-Patents.com; Jay A. Chesavage (57) ABSTRACT

Embodiments are provided for instructions cache system for a hardware multi-thread microprocessor. In some embodiments, a cache controller device includes multiple interfaces connected to a hardware multi-thread microprocessor. A first interface of the multiple interfaces can receive a fetch request from a first execution thread during a first clock cycle. A second interface of the multiple interfaces can receive a fetch request from a second execution thread during a second clock cycle after the first clock cycle. The cache controller device also includes a multiplexer to send first response signals in response to the fetch request from the first execution thread, and also to send second response signals in response to the fetch request from the second execution thread.

21 Claims, 6 Drawing Sheets

(56) References Cited

U.S. PATENT DOCUMENTS

| | | |
|---|---|---|
| 2006/0179279 A1 | 8/2006 | Jones et al. |
| 2007/0113053 A1 | 5/2007 | Jensen et al. |
| 2008/0270758 A1* | 10/2008 | Ozer .................. G06F 12/0897 711/E12.024 |
| 2009/0113180 A1 | 4/2009 | Banerjee et al. |
| 2011/0320771 A1* | 12/2011 | Mejdrich .............. G06F 9/3814 712/201 |
| 2012/0272043 A1 | 10/2012 | Nuechterlein |

* cited by examiner

MULTIPLE INTERFACES FOR MULTIPLE THREADS OF A HARDWARE MULTI-THREAD MICROPROCESSOR

BACKGROUND

This disclosure relates to instruction cache (I-Cache) for hardware multi-thread microprocessor.

SUMMARY

This disclosure recognizes and addresses the issue of supply of program instructions via an instruction cache (I-Cache) subsystem to a processor, such as a hardware multi-thread microprocessor.

According to an embodiment, the disclosure provides a device. The device comprises multiple interfaces connected to a hardware multi-thread microprocessor. A first interface of the multiple interfaces to receive a fetch request from a first execution thread during a first clock cycle. The fetch request is received from instruction fetch (IF) circuitry. A second interface of the multiple interfaces to receive a fetch request from a second execution thread during a second clock cycle after the first clock cycle. That fetch request also is received from the IF circuitry. The device also comprises a multiplexer to send first response signals in response to the fetch request from the first execution thread and to send second response signals in response to the fetch request from the second execution thread.

In addition to the one or more elements described herein in connection with that device, the first interface to further receive an instruction address during the first clock cycle, the instruction address defined by a first program counter of the hardware multi-thread microprocessor, and the second interface to further receive a second instruction address during the second clock cycle, the second instruction address defined by a second program counter of the hardware multi-thread microprocessor.

In addition to the one or more elements described herein in connection with that device, the multiplexer sends a particular one of the first response signals during a third clock cycle succeeding the first clock cycle, the particular one of the first response signals being indicative of a cache miss.

In addition to the one or more elements described herein in connection with that device, the multiplexer sends a particular one of the second response signals during a fourth clock cycle succeeding the second clock cycle, the particular one of the second response signals being indicative of a program instruction corresponding to the second instruction address being available at data storage coupled to the device.

In addition to the one or more elements described herein in connection with that device, the multiplexer sends a second particular one of the second response signals during a fourth clock cycle after the second clock cycle, the second particular one of the second response signals being indicative of a cache line being available, wherein the cache line contains a program instruction corresponding to the instruction address.

In addition to the one or more elements described herein in connection with that device, the first interface receives the instruction address during a fifth clock cycle succeeding the fourth clock cycle, and wherein the multiplexer sends a second particular one of the first response signals during a sixth clock cycle succeeding the fifth clock cycle, the second particular one of the first response signals being indicative of a program instruction corresponding to the instruction address being available at data storage coupled to the device.

In addition to the one or more elements described herein, the device can be connected to a data storage comprising multiple memory banks, wherein a first one of the multiple memory banks has a defined number of rows, each row containing multiple words corresponding to respective program instructions.

In addition to the one or more elements described herein, the device can be further connected to a first memory device having multiple rows, each one of the multiple rows having a width of 13 bits, wherein a number of the multiple rows is defined by a number of the multiple memory banks and the defined number of rows.

In addition to the one or more elements described herein in connection with that device, a first row of the multiple rows comprising a 13-bit tag datum that, in combination with a 4-bit offset datum and a 7-bit index datum, identifies a 24-bit instruction address of a program instruction within a memory bank of the multiple memory banks.

In addition to the one or more elements described herein, the device can be further connected to a second memory device comprising retention logic that dictates removal of data from the first memory device, the logic including pseudo least-recently-used (LRU) logic.

According to another embodiment, the disclosure provides a cache system. The cache system comprises a cache controller device comprising multiple interfaces connected to a hardware multi-thread microprocessor. A first interface of the multiple interfaces to receive a fetch request from a first execution thread. A second interface of the multiple interfaces to receive a fetch request from a second execution thread. The cache controller device further comprises a multiplexer to send first response signals in response to the fetch request from the first execution thread and to send second response signals in response to the fetch request from the second execution thread. The cache system also comprises data storage comprising multiple memory banks, wherein a first one of the multiple memory banks has a defined number of rows, each row containing multiple words corresponding to respective program instructions.

In addition to the one or more elements described herein in connection with the cache system, the cache system also includes a first memory device having multiple rows, each one of the multiple rows having a width of 13 bits, wherein a number of the multiple rows is defined by a number of the multiple memory banks and the defined number of rows.

In addition to the one or more elements described herein in connection with the cache system, a first row of the multiple rows comprising a 13-bit tag datum that, in combination with a 4-bit offset datum and a 7-bit index datum, identifies a 24-bit instruction address of a program instruction within a memory bank of the multiple memory banks.

In addition to the one or more elements described herein in connection with the cache system, the cache system further includes a second memory device comprising retention logic that dictates removal of data from the first memory device, the logic including pseudo least-recently-used (LRU) logic.

In addition to the one or more elements described herein in connection with the cache system, the second memory device comprises 256 rows, each row having a width of 3 bits.

According to yet another embodiment, the disclosure provides a microcontroller unit. The microcontroller unit comprises a hardware multi-thread microprocessor. The microcontroller unit also comprises a cache system comprising multiple interfaces connected to a hardware multi-thread microprocessor. A first interface of the multiple interfaces to receive a fetch request from a first execution thread during a first clock cycle. A second interface of the multiple interfaces to receive a fetch request from a second execution thread during a second clock cycle after the first clock cycle. The cache system also comprises a multiplexer to send first response signals in response to the fetch request from the first execution thread and to send second response signals in response to the fetch request from the second execution thread. The microcontroller unit further comprises a first memory device comprising multiple memory banks, wherein a first one of the multiple memory banks has a defined number of rows, each row containing multiple words corresponding to instruction addresses of respective program instructions.

In addition to the one or more elements described herein, the first interface to further receive an instruction address during the first clock cycle, the instruction address defined by a first program counter of the hardware multi-thread microprocessor, and the second interface to further receive a second instruction address during the second clock cycle, the second instruction address defined by a second program counter of the hardware multi-thread microprocessor.

In addition to the one or more elements described herein, the multiplexer sends a particular one of the first response signals during a third clock cycle succeeding the first clock cycle, the particular one of the first response signals being indicative of a cache miss.

In addition to the one or more elements described herein, the multiplexer sends a particular one of the second response signals during a fourth clock cycle succeeding the second clock cycle, the particular one of the second response signals being indicative of a program instruction corresponding to the second instruction address being available at data storage within the cache system.

In addition to the one or more elements described herein, the multiplexer sends a second particular one of the second response signals during a fourth clock cycle after the second clock cycle, the second particular one of the second response signals being indicative of a cache line being available, wherein the cache line contains a program instruction corresponding to the instruction address.

In addition to the one or more elements described herein, the first interface receives the instruction address during a fifth clock cycle succeeding the fourth clock cycle, and wherein the multiplexer sends a second particular one of the first response signals during a sixth clock cycle succeeding the fifth clock cycle, the second particular one of the first response signals being indicative of a program instruction corresponding to the instruction address being available at data storage within the cache system.

There are many ways to apply the principles of this disclosure in an embodiment. The above elements and associated technical improvements of this disclosure are examples, in a simplified form, of the application of those principles. The above elements and technical improvements and other elements and technical improvements of this disclosure are clear from the following detailed description when considered in connection with the annexed drawings.

DETAILED DESCRIPTION

Embodiments of this disclosure address the issue of supply of program instructions via an instruction cache (I-Cache) subsystem to a processor, such as a hardware multi-thread microprocessor. Advanced microprocessors can have many stages of pipeline and usually can execute larger program code. Because absence of a program instruction during the execution of executable program code can incur idle pipeline cycles, I-cache subsystem can permit maintaining the pipeline busy with the processing of program instructions rather than idle waiting for those instructions. Embodiments of the disclosure improve existing I-cache subsystem by multiplexing fetch control signaling and/or data sent to the hardware multi-thread microprocessor. As such, in situations where a program instruction for an execution thread is unavailable at the I-cache subsystem, embodiments of the disclosure avoid blocking another execution thread from obtaining a desired program instructions that is available at the I-cache subsystem.

Although embodiments are disclosed in connection with dual-thread scenarios, the disclosure is not limited in that respect. Indeed, the principles of this disclosure may be implemented for more than two threads.

Figure 1:
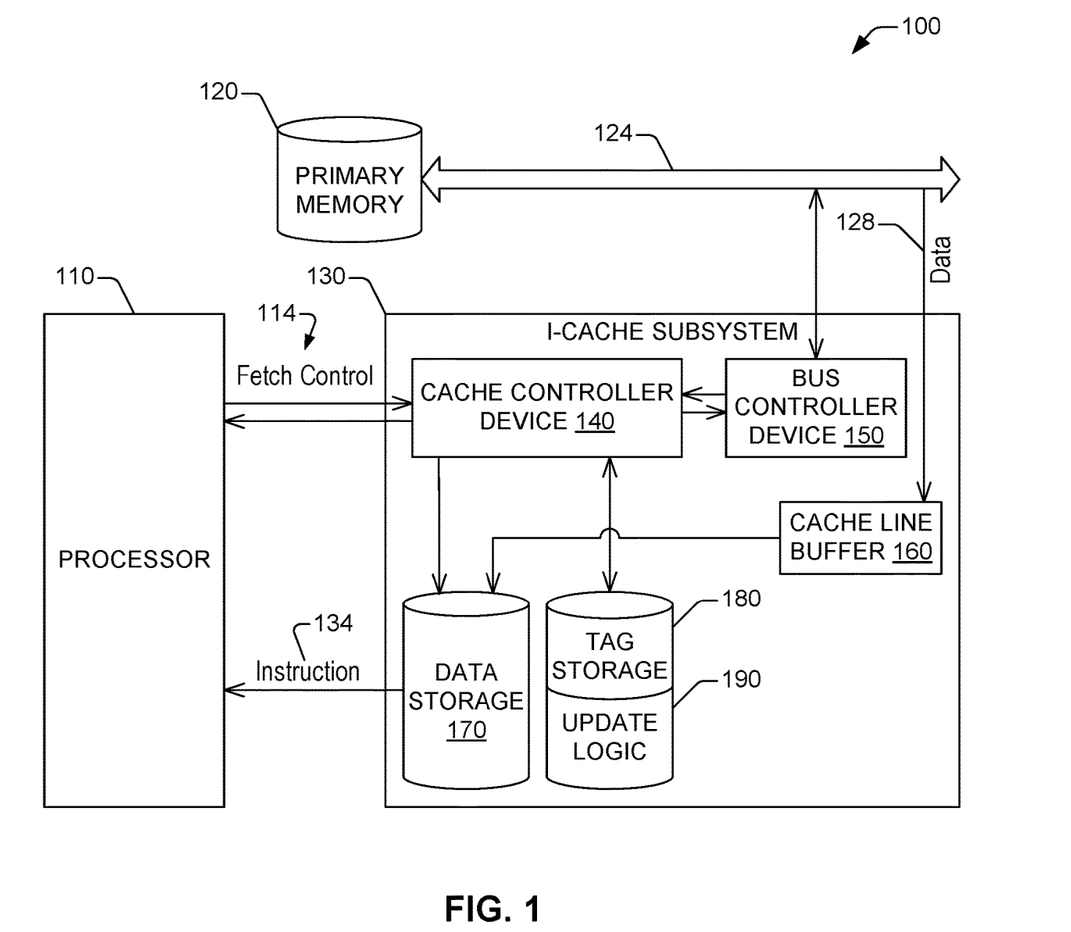
FIG. 1 illustrates an example of a processing system that includes an I-Cache subsystem, in accordance with one or more embodiments of this disclosure.

With reference to the drawings, FIG. 1 illustrates an example of a processing system 100, in accordance with one or more embodiments of this disclosure. The processing system 100 includes a processor 110 and an instruction cache (I-Cache) subsystem 130. During execution of executable program code (also referred to as a program) the processor 110 obtains a program instruction to execute. To that end, the processor 110 relies on fetch control 114 (data and signaling). The program instruction can be obtained from either one of two storage sources: a primary memory device 120 accessible by means of a bus architecture 124, or the I-Cache subsystem 130. The primary memory device 120 can be embodied in one of a main memory device having high capacity or another type of primary storage medium (such as a high-capacity external memory device). In either case, because access to data involves transporting data through the bus architecture 124, accessing the data can consume a few to several clock cycles. The bus architecture 124 can be embodied in an advance microcontroller bus architecture (AMBA) high-performance bus (AHB), in some cases.

Access to data available in the I-Cache subsystem 130 can be significantly faster than access to data in the primary memory device 120, consuming a single clock cycle. Capacity of the I-Cache subsystem 130, however, is less than that of the primary memory device 120. As is illustrated in FIG. 1, the I-Cache subsystem 130 can include one or more memory devices 170 (referred to as data storage 170) that can retain data defining program instructions that may be obtained by the processor 110. In some embodiments, the data storage 170 includes multiple memory devices, each embodied in a memory bank. The number of memory banks can be 2, 4, 8, or 16, in some cases. Storage capacity of the data storage 170 is less than the primary memory device 120.

Accordingly, the data storage 170 can retain a portion of a program that may be executed by the processor 110. The portion of the program includes program instructions including one or several recently accessed program instructions and/or one or several frequently used program instructions. The program instructions need not be contiguous. That is, the portion of the program that is present in the I-Cache subsystem 130 can include different non-contiguous segments of the program. Yet, program instructions within a segment are consecutive program instructions. A program instruction within the data storage 170 can be received prior to execution of a program that includes the program instruction, for example. The program instruction can be received via the bus architecture 124. Specifically, data 128 defining the program instruction can be received at a cache line buffer 160 included in the I-Cache subsystem 130. The data 128 can define an entire cache line. In some implementations, the cache line can have a width of 16 bytes defining four 32-bit words, each word defining a program instruction. In other implementations, the cache line can have a width of 32 bytes defining eight 32-bit words, each word defining a program instruction. While the data 128 (which can be referred to as cache line data) is being transferred from the bus architecture 124, the incoming data can be stored in the cache line buffer 160 until the data 128 that has been transferred constitutes an entire cache line (e.g., 16 bytes). The cache line buffer 160 can then store the entire cache line in the data storage 170. The entire cache line can be stored in a single event (or at once) rather than in piecemeal fashion. It is noted that if data in the data storage 170 is updated in every clock cycle during data transfer from the bus architecture 124, then it may obfuscate the other thread which may have hit on that cache line and/or that cache line also may be selected for removal from the data storage 170 for new cache line entry. Additionally, by storing an entire cache line in a single event, the I-Cache subsystem 130 can allow access from the other thread that is cache-hit.

When memory space is available within the data storage 170, the cache line buffer 160 can pass the data 128 defining a cache line to the data storage 170. In other situations, when such space is unavailable, the cache line buffer 160 can overwrite a particular portion (e.g., an entry (or row)) of the data storage 170. In some embodiments, the cache controller device 140 can determine the particular portion that is overwritten using one of several selection algorithms. For example, that particular portion can be determined using defined replacement logic (referred to as victim selection algorithm). The I-Cache subsystem 130 can include a memory device 190 (a buffer, for example) storing the defined replacement logic and the cache controller device 140 can apply the replacement logic. In one aspect, the cache controller device 140 can apply the replacement logic by controlling the storage of data in the data storage 170. More specifically, by controlling the memory location within the data storage 170, the cache controller device 140 can control the portion of the data storage 170 to be overwritten according to the victim selection algorithm. The memory device 190 can be referred to as update logic 190.

In order to determine that a desired program instruction is present in the data storage 170, and to access such program instruction when present, several mapping techniques can be used to associate a memory address with memory elements in the data storage 170. An example of a mapping is the set associative mapping. In such a mapping, a memory address is identified by three fields: a tag field, an index field, and an offset field. The width of each memory row can be defined by offset size. In cases where the offset is 4-bit field, then a row of a memory bank within the data storage 170 spans 16 bytes. The number of memory banks that form the data storage 170 is called the number of ways. If the index field is used as a memory bank address, a same index field can indicate that all memory banks are accessed jointly during read. Using the upper tag field as an address, a bank can be selected and a word can be selected using the offset field.

In some embodiments, there are eight ways in the set associative mapping. That is, there are eight memory banks in the data storage 170. In an example scenario, 128 entries can be are allowed on each memory bank. Each entry is referred to as a cache line. In cases where the offset field is a 4-bit field, each cache line spans 16 bytes (128 bits). Thus, each cache lines can include four 32-bit words. Each word can define a program instruction, and four consecutive program instructions can be retained in each cache line. The index field can be a 7-bit field, with the offset field being 4-bit field. In an embodiment in which the bus architecture 124 supports 32-bit addresses, each tag field entry can be 21-bit wide. Accordingly, the I-Cache subsystem 130 can include a memory device 180 (referred to as tag storage 180) that retains tag field values corresponding to respective memory addresses. The number of entries in the tag storage 180 can be 8×128=1024 (which is the total number of program instructions retained in the eight ways, each having 128 entries). In addition, each tag field entry can include a valid bit.

In other embodiments, there are four ways in the set associative mapping—that is, there are four memory banks in the data storage 170. In those embodiments, each memory bank can have 256 entries (or cache lines) each spanning 16 bytes in cases the offset field is a 4-bit field. Accordingly, the number of entries in the tag storage 180 can again be 1024 (4×256; which is the total number of program instructions retained in the four ways, each way having 256 entries). In addition, the index field can be an 8-bit field. Further, rather than relying on the 32 bits of an instruction address (as it can be provided by a 32-bit bus architecture 124) the I-Cache subsystem 130 can use the lower 24 bits of the 32-bit instruction address to obtain a program instruction. Hence, the tag field can be a 13-bit field, including a validation bit. That is, the offset field and the index field can be defined, respectively, by bits [3,0] of the instructions address and bits [11:4] of the instruction address. Such an offset field is used to find a program instruction within a cache line, and that index field is used to locate one or more tag entries, and each way (or memory bank). Bits [23:12] of the instruction address provides 12 bits of the tag field, and the 13th bit is the validation bit. It is noted that the upper 8-bit instruction address ([31:24]) can be used in embodiments in which the whole 32-bit instruction address is cacheable area. In those embodiments, the size of each tag entry field can be increased proportionally while satisfying the condition that the combined width of offset field, index field, and tag field be less than 32 bits. It is noted that in other embodiments, a different number Q of lower bits of the 32-bit instruction address can be used. In some cases, Q can be equal to 18.

A group of program instructions can be removed from the data storage 170 according to defined retention logic. To that end, the update logic 190 (a buffer, for example) can store the defined retention logic and the cache controller device 140 that can apply the defined retention logic. In embodiments in which a memory bank in the data storage 170 has 256 entries, the update logic 190 can have 256 entries and each entry can span 3 bits. The update logic 190 can be updated in response to a cache hit. The defined retention logic can be embodied in the pseudo least-recently-used (LRU) algorithm. The pseudo LRU retention algorithm relies on the idea that frequently used cache lines in the data storage 170 are likely to be used at a near future time based on locality of a program. Accordingly, the update logic 190 can be embodied in a pseudo LRU buffer having multiple entries, e.g., 256 entries, each entry embodied in a 3-bit field (referred to as 3-bit logic). The disclosure is not limited to that number of entries and/or bit field, nor is it limited to that update algorithm. Indeed, the defined retention logic can be embodied in other cache algorithms in some embodiments. Examples of those other cache algorithms include first-in-first-out (FIFO) and last-in-first-out (LIFO).

Figure 2:
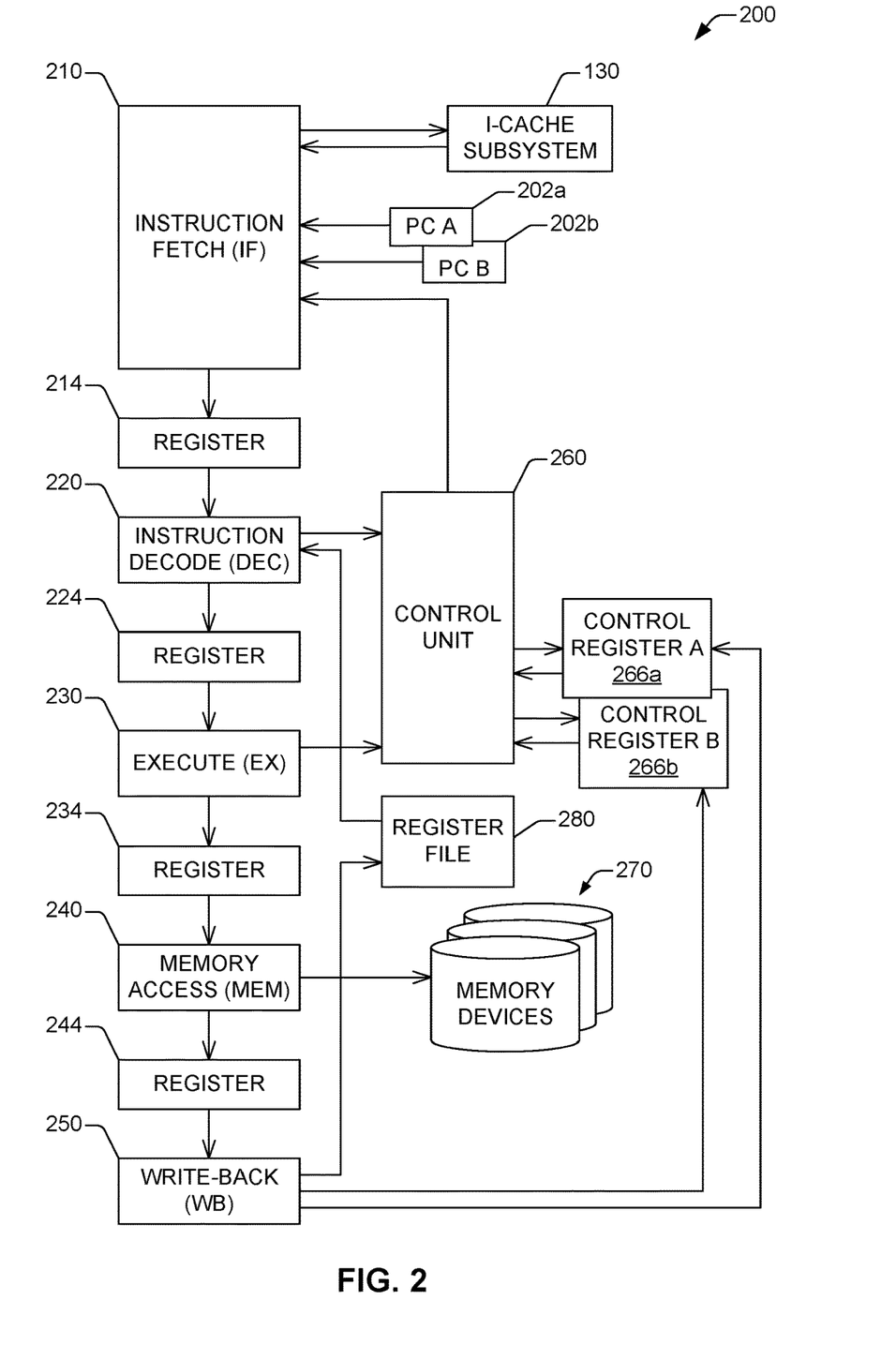
FIG. 2 illustrates an example of a hardware multi-thread microprocessor, in accordance with one or more embodiments of this disclosure.

In some embodiments, as mentioned, the processor 110 can be embodied in a hardware multi-thread microprocessor 200 as is illustrated in FIG. 2. The hardware multi-thread microprocessor 200 is a pipelined microprocessor that can support multiple thread operation. The hardware multi-thread microprocessor 200 can be integrated into a microcontroller unit (MCU) or another type of microcontroller device to provide processing functionality in accordance with aspects of this disclosure.

The hardware multi-thread microprocessor 200 includes a five-stage pipeline having an instruction fetch (IF) stage 210, an instruction decode (DEC) stage 220, an execute (EX) stage 230, and a memory access (MEM) stage 240, and a writeback (WB) stage 250. In some embodiments, the MEM stage 240 also can include execution circuitry and, thus, the MEM stage 240 represents a MEM/EX2 stage. Each of those stages is embodied in, or includes, processing circuitry. The disclosure is not limited to microprocessors that have a five-stage pipeline. In some cases, more or fewer than five stages can be contemplated.

In some embodiments, the hardware multi-thread microprocessor 200 supports two threads. Simply for the sake of nomenclature and clarity of the description hereinafter, a first thread and a second thread can be labeled "A" and "B", respectively. In those embodiments, the multi-thread microprocessor 200 can execute two different programs concurrently within a single core by interleaving instructions. Interleaved execution allows parallel execution of two or more programs within a single core. In addition, overall execution speed can be improved because interleaved execution can hide some latency by allowing one thread to run even when the other thread is stalled. Or it could save run time by reducing the overall stall time if both threads stalled.

More specifically, an executable program corresponding to thread A can have an ordered sequence of instructions {ATI1, ATI2, ATI3, ATI4, . . . }. In turn, another executable program corresponding to thread B can have a sequence of instructions {BTI1, BTI2, BTI3, BTI4, . . . }. The instructions in those programs are executed in interleaving manner, meaning that the hardware multi-thread microprocessor 200 fetches instructions by alternating the executable programs.

Figure 3:
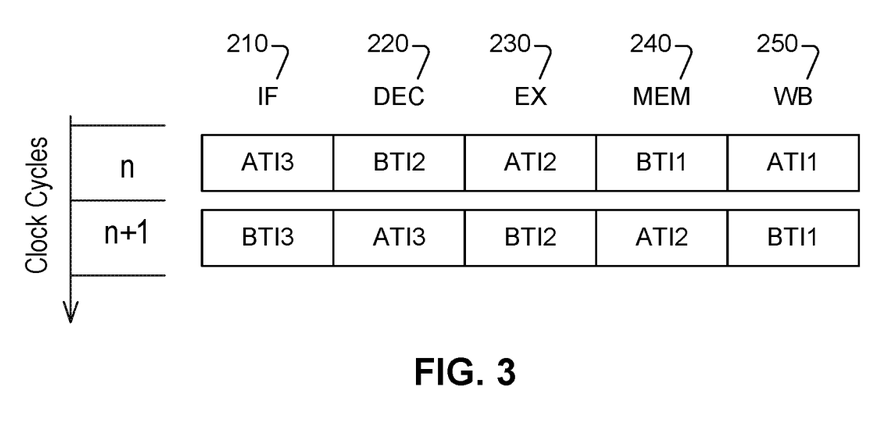
FIG. 3 illustrates an example of execution of program instructions in a pipeline of the hardware multi-thread microprocessor shown in FIG. 2, in accordance with one or more embodiments of this disclosure.

As is illustrated in FIG. 3, in the pipeline, an example of an instruction execution snapshot at time t=n is ATI3, BTI2, ATI2, BTI1, ATI1. Here n represents the n-th clock cycle of the hardware multi-thread microprocessor 200. An example of an instruction execution snapshot at time t=n+1 is BTI3, ATI3, BTI2, ATI2, BTI1. Interleaved execution of the two executable programs is equivalent to having two f/2 single-thread microprocessor within one f dual-thread microprocessor.

During execution of a program, the IF stage 210 (FIG. 2) obtains program instructions to execute from the primary memory device 120 or the data storage 170. As such, the hardware multi-thread microprocessor 200 can be functionally coupled to the I-Cache subsystem 130. The hardware multi-thread microprocessor can include multiple program counters (PCs) corresponding to respective threads. The multiple PCs include a first PC 202a and a second PC 202b. The IF stage 210 receives an address from a PC, such as PC 202a. The address points to a location in the primary memory 120 (FIG. 1) that contains the program instruction—a word having bits defining an opcode and operand data that constitute the instruction. In some embodiments, the word can span 32 bits. In other embodiments, the word can span 16 bits.

With further reference to FIG. 1, the processor 110, via the IF stage 210, for example, can send both a fetch request for the program instruction and the instructions address to the I-Cache subsystem 130. In instances in which the program instruction is available in the data storage 170, the processor 110 can obtain the program instruction directly from the I-Cache subsystem 130. Thus, the fetch request to the I-Cache subsystem 130 results in the program instruction being provided directly from the data storage 170. The program instruction is provided as data 134 (also referred to as instruction 134). Such a fetch request is referred to as an "cache hit" or "hit."

Figure 4:
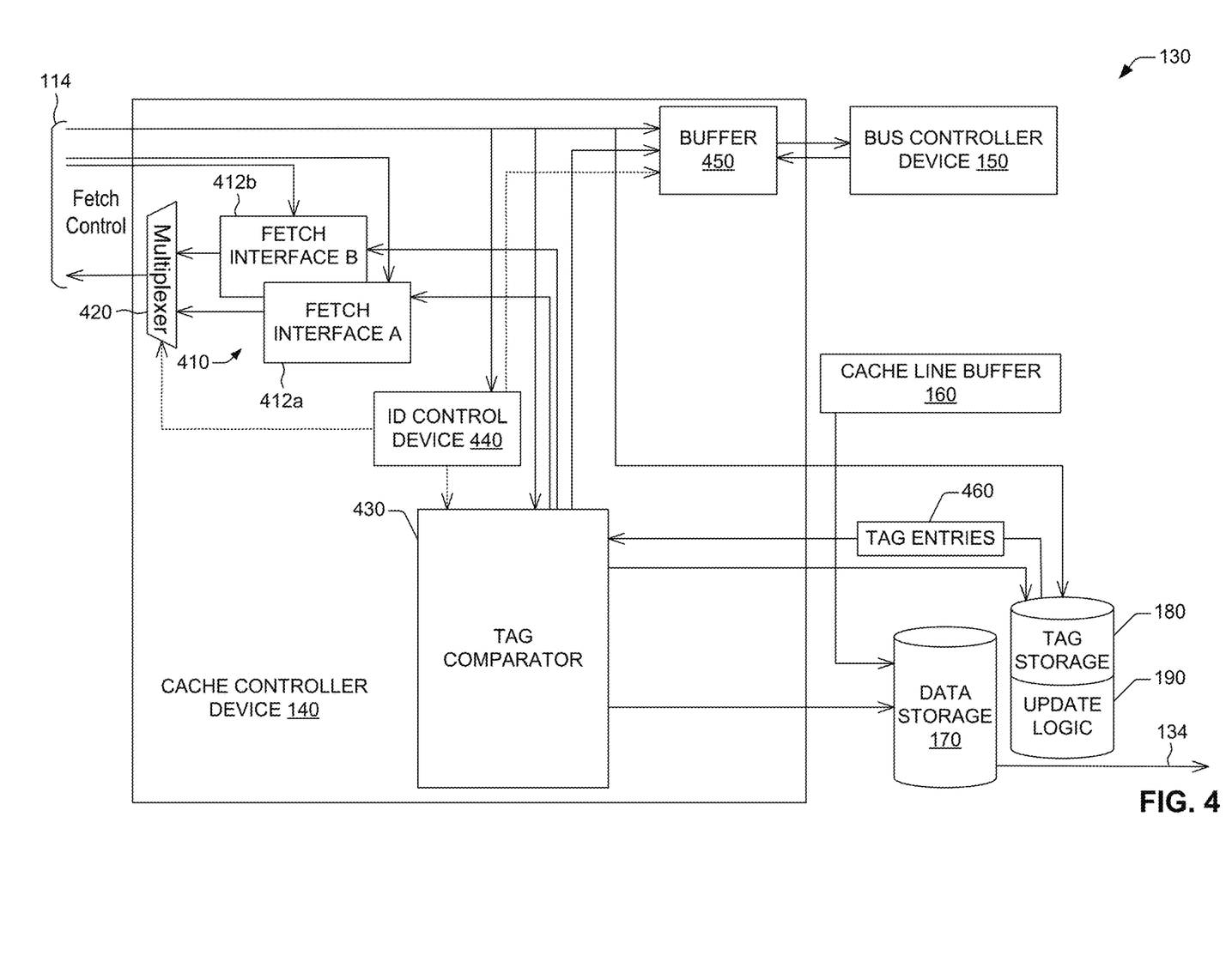
FIG. 4 illustrates an example of a controller device integrated into the I-Cache subsystem included in the processing system illustrated in FIG. 1, in accordance with one or more embodiments of this disclosure.

More specifically, in an I-Cache Hit, the processor 110 sends the fetch request and the instruction address as part of the fetch control 114 during a clock cycle no. The instruction address can be defined by a program counter of the processor 110. To that end, the IF stage 210 (FIG. 2) can be connected to a cache controller device 140 included in the I-Cache subsystem 130. In some embodiments, as is shown in FIG. 4, the cache controller device 140 includes multiple interfaces 410, each individually connected to the IF stage 210 (FIG. 2). The multiple interfaces 410 can correspond to respective execution threads in the hardware multi-thread microprocessor 200 (FIG. 2). Each one of the multiple interfaces can include a layer of flip-flops that can apply the cache logic described herein.

The multiple interfaces include a first interface 412a and second interface 412b. While two fetch interfaces are shown in FIG. 4, the disclosure is not limited in that respect and one or more additional fetch interfaces can constitute the multiple interfaces 410. For example, four fetch interfaces can constitute the multiple interfaces 410. Such four fetch interfaces corresponding to respective threads. In addition, the IF stage 210 can be connected to tag comparator circuitry 430 also included in the cache controller device 140.

The cache controller device 140 can receive the fetch request at one of the interfaces 410 (e.g., fetch interface 112a) and, in response, can accept or reject the instruction address during the clock cycle no. The cache controller device 140 can reject the address when busy. In response to accepting the address, the cache controller device 140 can send a response signal to the IF stage 210, for example, as part of the fetch control data 114. The response signal can be referred to as "fetch grant" (which may be denoted as fetch_gnt). Fetch grant may constitute a hand-shake protocol between the IF stage 210 and the cache controller device 140. As is illustrated in FIG. 4, the cache controller device 140 can include a multiplexer 420 that can send the response signal to the processor 110.

The tag comparator circuitry 430 can receive the address and, in some cases, can determine that a program instruction matching the instruction address is available in the data storage 170. Such a determination can be made during an immediately subsequent clock cycle $n_0+1$. To determine that the program instruction is available in the data storage 170, the tag comparator circuitry 430 can search the tag storage 180 and the group of memory banks (or ways) that constitute the data storage 170 using index field defined by the received instruction address. As mentioned, in some embodiments, the index field can be an 8-bit field defined by bits [11:4] in the received instruction address. The tag storage 180 can be searched by comparing each entry in the tag storage 180 to the address. In those embodiments there may be four ways and, thus, four tag entries at a time can be compared to the received instruction address, where each tag entry is embodied in a 13-bit field. The four tag entries correspond to a same index field value (or index), and each one of the four tag entries is associated with a respective memory bank data. The four tag entries can be received by the tag comparator circuitry 430 as data 460 (referred to as tag entries 460). It is noted that in other embodiments, the tag entries 460 can define fewer or more than four tag entries depending on the number of memory banks that constitute the data storage 170. For instance, the tag entries 460 can define eight tag entries in embodiments in which eight memory banks constitute the data storage 170. A comparison that yields a match between bits [23:12] of the received instruction address and one of the four tag entries indicates that the program instruction corresponding to the received instruction address is present in the data storage 170.

It is noted that embodiments of this disclosure are not limited to four ways, 8-bit index field, and 4-bit offset field. Indeed, in some embodiments, the data storage 170 can contain W ways (or W memory banks). Further, in embodiments in which the processor 110 is a 32-bit processor and 32-bit addresses are supported, the index field can have s-bit length and the offset field can have v-bit length. Here, s and v are natural numbers. Accordingly, that tag storage 180 can have $2^v \times W$ entries, where each entry is (32-s-v)-bit wide. Further, the data storage 170 also can contain $2^v \times W$ entries, where each entry is $2^s$-byte wide.

Regardless of specific number of ways and respective lengths of index field and offset field, in response to a determination that the received instructions address is present in the data storage 170, during the clock cycle $n_0+1$, the tag comparator circuitry 430 can send a fetch ready signal indicating that the program instruction is present in the data storage 170. The fetch ready signal can be sent to a high value as an indication that the program instruction is available, for example. The tag comparator circuitry 430 can send such a fetch ready signal by sending the fetch ready signal to a particular interface of the multiple interfaces 410 that corresponds to the thread in execution (either one of thread A or thread B, for example). The fetch ready signal can then be sent, by mean of the multiplexer 420, for example, to the processor 110. In addition, still during the clock cycle $n_0+1$, the tag comparator circuitry 430 can identify the program instruction by using the offset field defined by bit [3:0] of the received addressed, and can send data defining the program instruction to the particular interface. Such data can then be sent to the processor 110 by means of the multiplexer 420, as instruction 134 (FIG. 1). The program instruction can be a 32-bit instruction.

There may be instances in which a program instruction in unavailable in the data storage 170. In those instances, the processor 110 can obtain the program instruction from the primary memory 120, with the I-Cache subsystem 120 serving as an intermediary subsystem. Accordingly, in those instances, a fetch request for the program instruction results in the data storage 170 being updated with data 128 from the primary memory 120 before the program instruction is provided to the processor 110. Such a request is referred to as "cache miss" or "miss."

More specifically, the cache controller device 140 can receive a fetch request at one of the interfaces 410 (e.g., fetch interface 112a) and, in response, can accept or reject the instruction address during a clock cycle no. As mentioned, in response to accepting the address, the cache controller device 140 can set fetch grant to high, for example, and can send the fetch grant signal to the IF stage 210, for example, as part of the fetch control data 114. Fetch grant can be set to high and sent during the clock cycle no.

The cache controller device 140 can determine that the desired program instruction is unavailable at the data storage 170. In response to such a cache miss, at a subsequent clock cycle $n_0+1$, the cache controller device 140 can send a response signal to the processor 110 indicating that the fetch request resulted in the cache miss. In some embodiments, the multiplexer 420 (FIG. 4) included in the cache controller device 140 can send the response signal to the processor 110. The response signal can be sent as part of fetch control data 114, and can be received by the IF stage 210 (FIG. 2) in some embodiments. That response signal can be referred to as "fetch miss" (also denoted as fetch_miss) and the cache controller device 140 can set the fetch_miss to high in response to the cache miss.

Further, to update the data storage 170 in response to the cache miss, the cache controller device 140 can cause a bus controller device 150 to send a request for data to the primary memory 120 via the bus architecture 120. The request can be sent at a second subsequent clock cycle $n_0+2$. The request contains the desired instruction address. In addition, as part of sending the request, the cache controller device 140 can send a state signal indicating that the cache line buffer 160 is busy receiving data. That state signal can be referred to as "line busy" and is specific to the thread T (e.g., A, B, C, or D) that resulted in the cache miss. hit. Thus, the line busy signal can be denoted as line_busy_T. The cache controller device 140 can set line_busy_T to high to indicate that the cache line buffer 160 is obtaining data. The line busy signal can be sent to processor 110 as part of fetch control 114. Accordingly, in scenarios in which the processor 110 can have up to four execution threads active, e.g., thread A, thread B, thread C, and thread D, the cache controller device 140 can set up to four different line busy signals: line_busy_A, line_busy_B, line_busy_C, and line_busy_D. Labels A, B, C, and D are simply used for the sake of nomenclature.

In embodiments in which instruction addresses span 32 bits each and the offset field is a 4-bit field, the request for data can be a request to fetch an entire 16-byte cache line. As mentioned, in some implementations, a 32-byte cache line (defining eight 32-bit words) can be fetched. Additionally, in embodiments in which the hardware multi-thread microprocessor 200 (FIG. 2) has a 64-bit architecture, the cache line can define 16 32-bit words, each word defining a program instruction. The request for data in a 32-bit architecture can contain 32 bits, with the four least significant bits (LSBs) set to zero and bits [31:4] corresponding to same bits in the desired instruction address. The bus controller device 150 can send the request using a bus protocol supported by the bus architecture 124. In case the bus architecture 124 is embodied in an AHB, the bus protocol can be the AHB protocol. In addition, the cache controller device 140 can retain the desired instruction address within an internal memory device, such as a buffer 450 (FIG. 4).

Further, in embodiments in which the processor 110 is a hardware multi-thread microprocessor, the cache controller device 140 also can retain a thread identifier (ID) that identifies a requestor thread T. In some cases, the thread ID can be two-bit field. Accordingly, up to four threads can be identified. As such, thread T can be one of thread A or thread B in a two-thread embodiment, or one or thread A, thread B, thread C, or thread D in a four-thread embodiment). It is noted that the hardware multi-thread microprocessor can support fewer or more than four threads. Hence, the thread ID is not limited to a two-bit field.

It is noted that in those embodiments, updating the data storage 170 with the requested cache line causes the requestor execution thread to incur idle clock cycles until the desired program instruction becomes available. For instance, using a 32-bit buffer, it takes four consecutive clock cycles of the processor 110 to receive a 16-byte cache line. In embodiments where the processor 110 is a hardware multi-thread microprocessor (such as hardware multi-thread microprocessor 200 (FIG. 2)) the requestor execution thread at the processor 110 remains idle during that time interval. As is illustrated in FIG. 4, the cache controller device 140 can include an ID control device 440 that can monitor state signals (such as line_busy_T) for a thread ID. The ID control device 440 can record a value of a state signal within the buffer 450. Such a value can be one of high or low, for example.

After the requested data defining the cache-miss program instruction is available at the cache line buffer 160, the data storage 170 and the tag storage 180 can be updated simultaneously with the fetched data (or cache line). In embodiments in which four memory banks (or ways) form the data storage 170. If there is an empty cache line (e.g., an available row) among the four memory banks, then the cache line buffer 160 can populate the empty cache line. The valid bit in the tag field corresponding to the populated cache line within the tag storage 180 can then be set. The cache line buffer 160 can set the valid bit in the tag field. Conversely, if an empty cache line is unavailable—that is, all entries in the tag storage 180 have respective valid bits set—then the cache line buffer 160 can overwrite one cache line within the four memory banks with the newly fetched cache line and the tag storage 180 can be updated. The cache controller device 140 can then cause the data storage 170 to pass the data defining the requested program instruction to processor 110, as instruction 134.

In embodiments where the processor 110 is a hardware multi-thread microprocessor multiple execution threads can send respective fetch requests to the I-Cache subsystem 130 in subsequent clock cycles. If each one of the respective fetch requests has a cache hit, then each one of the multiple execution threads retrieve respective program instructions consecutively, in succession, from the I-Cache subsystem 130, without any stall. In the alternative, if each one of the multiple execution threads has a cache miss, then pipeline of the multiple execution threads becomes stalled due to the lag of program instructions. Specifically, when cache miss occurs, the cache controller device 140 can send bus requests sequentially. When each one of the multiple execution threads causes a respective bus request, an execution thread has to wait until another execution thread that caused a prior bus request completes data retrieval from the primary memory 120, via the bus architecture 124.

In addition, when a first execution thread (e.g., thread A) has a cache miss, the I-cache subsystem 130 can receive a fetch request from a second execution thread (e.g., thread B) after initiating retrieval of data from the primary memory 120 for the first execution thread. That is, in clock cycle immediately after the cache controller device 140 has set line busy to high, the cache controller device 140 can receive the fetch request from the second execution thread.

That second execution thread can have a cache hit, and thus, the cache controller device 140 can cause the data storage 170 to provide the requested program instruction to the processor 110 while the cache-missed instruction address is being fetched. As a result, a microprocessor pipeline of the processor 110 avoids stalling. More concretely, by multiplexing data communication between the cache controller device 110 and the processor 110, the I-Cache subsystem 130 can avoid excessive stalling of the microprocessor pipeline. Such communication can be multiplexed by the multiplexer 420 and the multiple interfaces 410.

Figure 5:
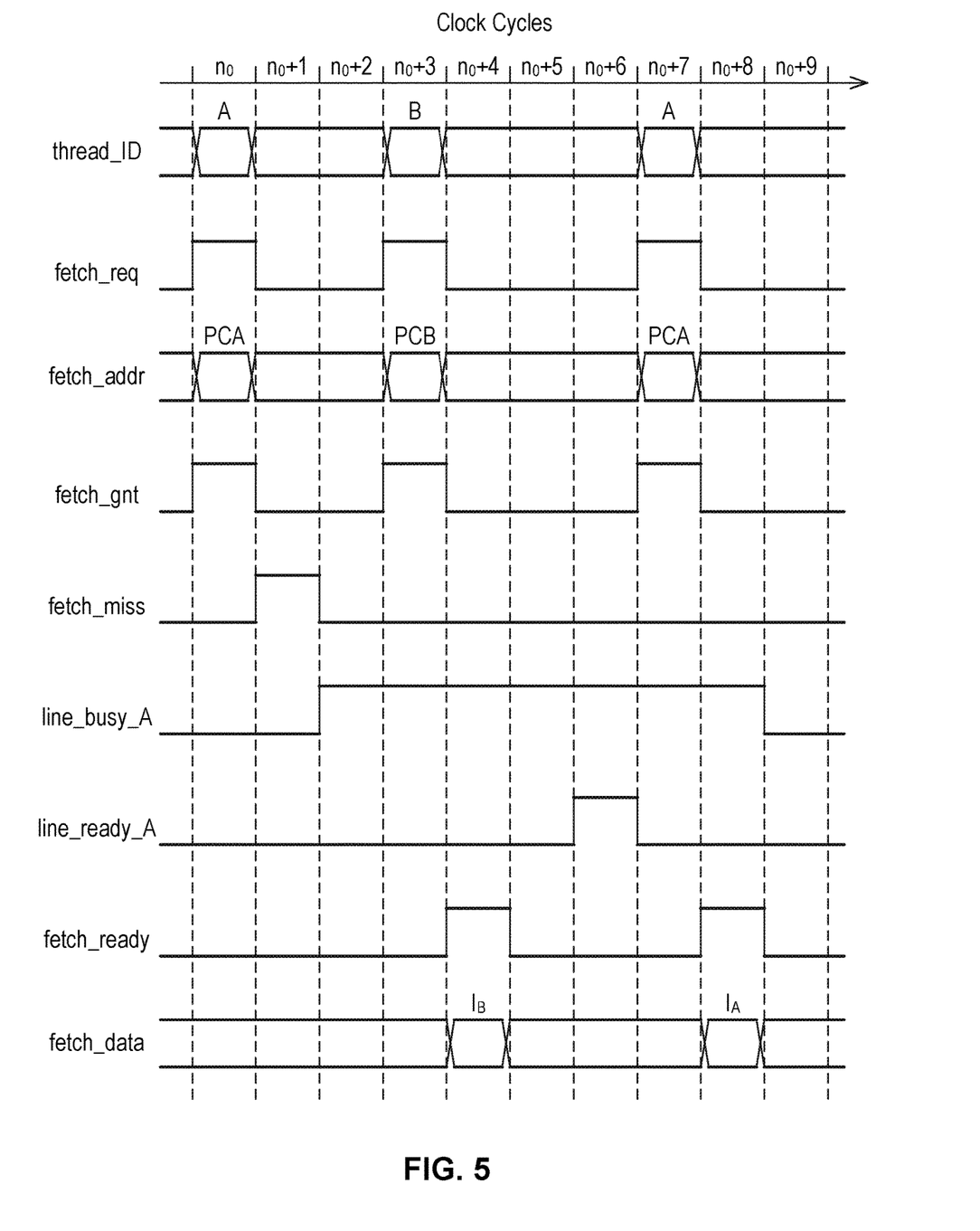
FIG. 5 illustrates an example of a fetch operation that can result in the supply of instructions from the I-Cache subsystem included in the processing system illustrated in FIG. 1, in accordance with one or more embodiments of this disclosure.

Simply as an illustration, FIG. 5 presents an example of a fetch operation that can result in the supply of instructions from the I-Cache subsystem included in the processing system illustrated in FIG. 1, in accordance with one or more embodiments of this disclosure. In that example, for purposes of explanation a first execution thread is represented by a thread A and a second execution is represented by thread B. Further, thread A has a cache miss and the thread B has a cache hit.

At a clock cycle $n_0$, the cache controller device 140 can receive, as part of fetch control 114, a fetch request from thread A. Accordingly, fetch request signal is set to high and data defining the requested instruction address is received by means of a fetch address signal. Second data identifying thread A also can be received. In FIG. 5, the fetch address signal is represented by fetch_addr and the data defining the requested instruction address is represented by "PCA." Additionally, the data identifying thread A is represented by thread ID. Thread ID can be a 2-bit field that can differentiate up to 4 threads. In scenarios where up to four execution threads may be active, one or more of those threads may not sent respective fetch requests in some cases. As a result, execution of one such thread may be skipped until the thread sends a fetch request. Thus, the ID control device 440 (FIG. 4) can use thread ID thread ID to monitor fetch request for a particular thread and associated cache miss or cache hit.

As mentioned, thread A has a cache miss, thus the cache controller device 140 can set fetch miss (represented by fetch_miss in FIG. 5) to high in the consecutive clock cycle $n_0+1$. The cache controller device 140 also can cause the bus controller device 150 to request data from the primary memory 120 via the bus architecture 124. The data defining a cache line that includes the program instructions corresponding to the requested instruction address. In a second consecutive clock cycle $n_0+2$, the cache controller device 140 can set line busy signal to high. In FIG. 5, the line busy signal is represented by fetch_miss. The cache controller device 140 maintains the line busy signal at high for as many cycles as it is necessary to transfer the entire cache line from the primary memory 120. In one embodiment, the cache line can span 16 bytes and the bus architecture 124 can support 32-bit words. Hence, the line busy signal for thread A can be kept high for four clock cycles—e.g., line_busy_A is high during clock cycles $n_0+2$, $n_0+3$, $n_0+4$, and $n_0+5$.

Because the cache controller device 140 includes respective interfaces for thread A and thread B, e.g., fetch interface A 412a and fetch interface B 412b, the cache controller device 140 can receive a fetch request from thread B during a clock cycle $n_0+3$ immediately after line_busy_A is set to high. As a result, the microprocessor pipeline of the processor 110 need not stall. Indeed, the cache controller device 140 can receive the fetch request and second data defining a requested instruction address (represented by PCB in FIG. 5). The requested instruction address can be defined by a program counter of the processor 110, for example. The cache controller device 140 can set fetch request to high. The cache controller device 140 also can set fetch_gnt to high in response to accepting PCB.

The cache controller device 140, via the tag comparator circuitry 430, for example, can determine that the fetch request is a cache hit. In response, during clock cycle $n_0+4$, the cache controller device 140 can send a response signal indicating that the program instruction corresponding to the requested instruction address is available at the data storage 170 coupled to the cache controller device 140. As mentioned, the data storage 170 can include a cache line that contains the program instruction. The cache controller device 140 can send such a response signal (represented by fetch_ready in FIG. 5) by setting the response signal to high. In some embodiments, the multiplexer 420 (FIG. 4) included in the cache controller device 140 sends the response signal. In further response, the cache controller device 140 also can cause the data storage 170 within the I-cache subsystem 130 to send the program instruction also during the clock cycle $n_0+4$. That program instruction is sent as instruction 134. In FIG. 5 the program instruction is represented by $I_B$ and the instruction 134 is represented by fetch_data. Update logic 190 (e.g., pseudo LRU buffer) is updated at this point because the fetch request is a cache hit.

As mentioned, the I-cache subsystem 130 can receive (or can continue receiving) data constituting a cache line for thread A while responding to the cache hit for thread B. After moving the 16-byte that can form that cache line into the I-cache subsystem 130 from the primary memory 120, the cache controller device 140 can send a state signal to the processor 110. The state signal can be referred to as "line ready" and can be indicative of the cache line being available at data storage 170. The line ready signal can be sent to processor 110 as part of fetch control 114. The line ready signal is specific to the thread T (e.g., A, B, C, or D) that resulted in the cache hit. Thus, the line ready signal can be denoted as line_ready_T. The cache controller device 140 can send that state signal by setting the line_ready_T to high to indicate that the cache line is available for the thread T. Accordingly, in scenarios in which the processor 110 can have up to four execution threads active, e.g., thread A, thread B, thread C, and thread D, the cache controller device 140 can set up to four different line ready signals: line_ready_A, line_ready_B, line_ready_C, and line_ready_D. The ID control device 440 (FIG. 4) can monitor such state signal for a thread ID. The ID control device 440 can record a value of the state signal within the buffer 450. Such a value can be one of high or low, for example.

In response to receiving such a state signal, the processor 110 can send a second fetch request using the previously requested instruction address (shown as PCA in FIG. 5). The cache controller device 140 determines that the fetch request is a cache hit, and sends a response signal to that effect during the immediately subsequent clock cycle $n_0+8$. In some embodiments, the multiplexer 420 (FIG. 4) included in the cache controller device 140 sends the response signal. That response signal can be sent by setting fetch_ready to high. In addition, also during the clock cycle $n_0+8$, the cache controller device 140 causes the data storage 170 within the I-cache subsystem 130 to send the program instruction corresponding to PCA. That program instruction also is sent as instruction 134. In FIG. 5 the program instruction is represented by $I_A$. Update logic 190 (e.g., pseudo LRU buffer) is updated at this point because the fetch request is a cache hit.

In some cases, thread A and thread B can request a same cache line, and that cache line may be absent from the I-cache subsystem 130. Because both threads have cache-miss, the first fetch request for instruction address causes a bus request for the cache line from the primary memory 120, via the bus architecture 124. The second fetch request remains in wait mode until a bus operation to obtain the cache line ends. As the cache line becomes available at the I-cache subsystem 130, the second fetch request for that cache line avoids a bus request for the cache line. When the cache controller device issues line_ready_A, thread A provides another fetch request (e.g., sets fetch_req to high) that results in cache hit. Thread B also provides another fetch request in a following clock cycle and, in response, the requested program instruction is obtained.

With further reference to FIG. 1 and FIG. 2, after the processor 110 has obtained the program instruction 134, the program instructions can be processed. As mentioned, the processor 110 can be embodied in a hardware multi-thread microprocessor. Accordingly, in such an embodiment, the IF stage 210 can pass the fetched program instruction to the DEC stage 220 in a clock cycle immediately after the program has been fetched. The DEC stage 220 identifies an instruction type and prepares operand data to execute. In some cases, the DEC stage 120 can determine that an instruction is a branch instruction. The branch instruction can be a conditional instruction or unconditional instruction.

EX stage 230 performs actual data operations based on the operand data received from the DEC stage 220. The MEM stage 240 accesses memory if an instruction is of load type or store type. Memory address is typically determined at EX state 230. That memory can be embodied in a particular memory device of multiple memory devices 270. The particular memory device can be external to the hardware multi-thread microprocessor 200, in some cases. The particular memory device can be volatile memory or non-volatile memory, and can include program memory or data memory, or both.

The WB stage 250 writes a result operand into a register file 280 and/or a control register within the hardware multi-thread microprocessor 200. The register file 280 can include 16, 32, or 64 registers, for example. Although a single register file 280 is shown, it is noted that the hardware multi-thread microprocessor 200 includes a register file 280 per thread T (e.g., A or B) of the multiple threads supported by the hardware multi-thread microprocessor 200. The control register can pertain to a particular thread executed by the hardware multi-thread microprocessor 200. For instance, the control register can be one of a control register 266a pertaining to a first thread or a control register 266b pertaining to a second thread. The result operand can be embodied in, for example, loaded data from memory or executed data from the EX stage 230.

Each stage can process data during a clock cycle, which also can be referred to as stage cycle or processor cycle. The clock cycle is determined by a clock frequency f of the hardware multi-thread microprocessor 200. In one example, f can have a magnitude of 100 MHz. After being processed during a clock cycle in one stage, data can be sent from that stage to another stage down the pipeline on a next clock cycle. To that end, the hardware multi-thread microprocessor 200 includes registers functionally coupling those stages. Each one of the registers serves as an input element to the stage that receives the data. In particular, to pass data from a first stage to a second stage, the first stage writes the data to the register coupling the first and second stages during a clock cycle. The second stage then reads the data from that register during a second clock cycle immediately after the clock cycle. The register is embodied in a storage device, such as a latch, a flip flop, or similar device. As is illustrated in FIG. 2, a register 214 functionally couples the IF stage 210 and the DEC stage 220; a register 224 functionally couples the DEC stage 220 and the EX stage 230; a register 234 functionally couples the EX stage 230 and the MEM stage 240; and a register 244 functionally couples the MEM stage 240 and the WB stage 250.

The register 214, register 224, register 234, and register 244 also constitute the five-stage pipeline of the hardware multi-thread microprocessor 200. The five-stage pipeline forms a core of the hardware multi-thread microprocessor 200. Because instructions are processed in sequence, the hardware multi-thread microprocessor 200 can be referred to as an in-order issue, in-order completion pipeline.

As is illustrated in FIG. 2, a first program counter 202a corresponds to a first thread (e.g., thread A) and a second program counter 202b corresponds to a second thread (e.g., thread B). The hardware multi-thread microprocessor 200 also includes a thread identifier (ID) generator (not depicted in FIG. 2, for the sake of clarity) that indicates which program counter is to be used during each fetch. In addition, because each thread can produce different flags, the single core also can be functionally coupled to two control registers: the first control register 266a for the first thread and the second control register 266b for the second thread.

The first control register 266a and second control register 266b can be written or read simultaneously by various stages, including DEC stage 220 for reading registers for multiply operations, EX stage 230 for reading register values for non-multiply operations, and WB stage 250 for writing results back to registers.

A control unit 260 allows operations of a first thread (e.g., thread A) and a second thread (e.g., thread B) to occur simultaneously. This is important because the control unit 260 can simultaneously receive a request to write a particular register from DEC stage 220 and a request to read that particular register from EX stage 230, or there may be a request to write back a value in WB stage 250 while there is a request to read a value in EX stage 230, and data coherency requires that all of these reads and writes be handled concurrently, which requires they all be on the same thread. The control unit 260 in this case provides the data value directly to the reading stage from the writing stage, simultaneously writing the new value into the required register.

Figure 6:
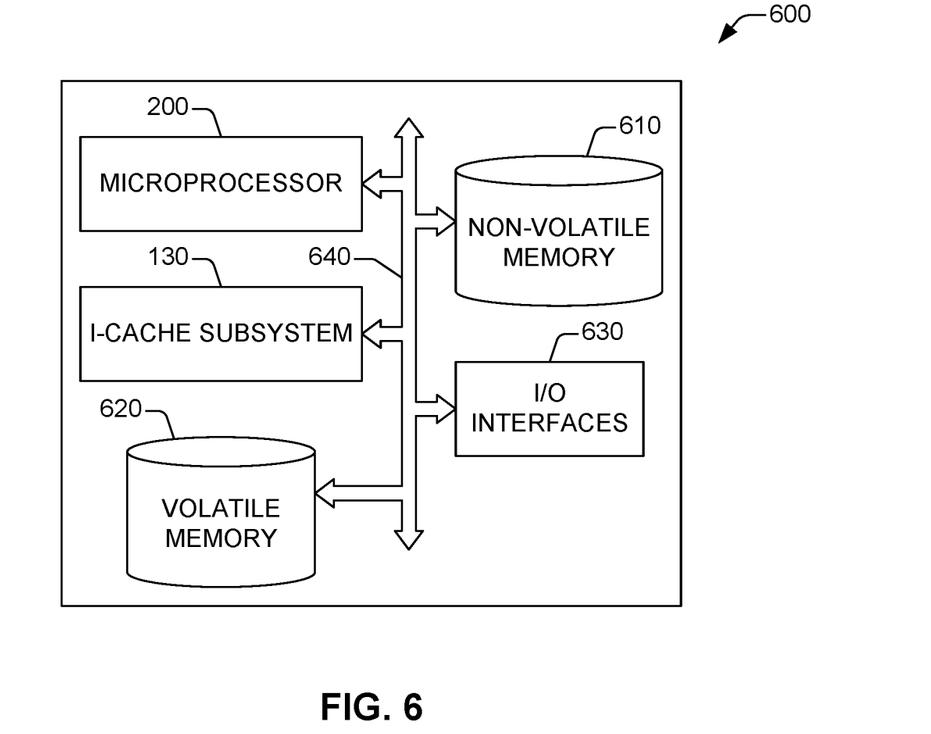
FIG. 6 illustrates an example of a microcontroller unit (MCU) that includes a hardware multi-thread microprocessor and I-cache subsystem in accordance with one or more embodiments of this disclosure.

FIG. 6 is a schematic block diagram of an example of an MCU 600 that includes the hardware multi-thread microprocessor 200 (FIG. 2) described herein. The MCU 600 also includes the I-cache subsystem 130 (FIG. 1) described herein, and, thus, can provide program instructions in accordance with aspects of this disclosure. In some embodiments, the components of the MCU 600 can be packaged into a single chipset. In other embodiments, such components can be packaged in two or more chipsets.

In addition to the hardware multi-thread microprocessor 200, the MCU 600 includes several memory devices. The memory devices include one or many non-volatile (NV) memory devices 610 (referred to as NV memory 610). In some cases, the NV memory 610 can include program memory storing program instructions that constitute an executable program. The hardware multi-thread microprocessor 200 can execute the executable program in one or many of multiple threads. Multiple copies of the executable program need not be stored in the program memory in order to execute multiple threads of the executable program. Thus, size requirements of the program memory can be constrained. In some embodiments, the NV memory 610 also includes data memory. The NV memory 610 can include one or more of ROM, EPROM, EEPROM, flash memory, or another type of non-volatile solid-state memory.

The memory devices in the MCU 600 also include and one or many volatile memory devices (referred to as volatile memory 620). The volatile memory 620 includes data memory storing data that is used for or results from execution of program instructions retained in the NV memory 610. In some cases, the volatile memory 620 also can include program memory storing program instructions that constitute an executable program. Again, the hardware multi-thread microprocessor 200 can execute the executable program in one or many of multiple threads. Thus, in those cases, the volatile memory 620 can embody, at least partially, the primary memory 120. The NV memory 610 can include one or more of SRAM, DRAM, or another type of volatile solid-state memory.

The MCU 600 also includes several input/output (I/O) interfaces 630 that, individually or in a particular combination, permit sending data to and/or receiving data from a peripheral device. The I/O interfaces 630 can be addressed individually by the hardware multi-thread microprocessor 200. The I/O interfaces 630 can include serial ports, parallel ports, general-purposed I/O (GPIO) pins, or a combination of those.

The MCU 600 further includes a bus architecture 640 that includes one or a combination of a data bus, an address bus, or a control bus. The bus 640 permits the exchange of data and/or control signals between two or more of the hardware multi-thread microprocessor 200, the I-Cached subsystem 130, the NV memory 610, the volatile memory 620, and the I/O interfaces 630. The bus architecture 640 can embody the bus architecture 124 (FIG. 1) in some cases.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A device, comprising:
   a hardware multi-thread processor executing a plurality of execution threads including at least a first execution thread and a second execution thread, each execution thread of the plurality of execution threads having an associated thread identifier (thread_id), the hardware multi-thread processor having a single sequence of pipeline stages, each pipeline stage sending data to a subsequent pipeline stage on each clock cycle, a first pipeline stage being an instruction fetch (IF) stage requesting executable instructions, each executable instruction accompanied by one of the associated thread ids and an instruction address;

a cache controller coupled to tag storage, the tag storage having a list of tag entries corresponding to cached instruction addresses, each tag entry maintaining an association between an executable instruction and an instruction address of a plurality of instruction addresses, and data storage sending executable instructions directly to the multi-thread processor, each executable instruction that the data storage sends to the multi-thread processor being associated with a corresponding tag storage instruction address, the cache controller comprising:

multiple interfaces coupled to the multi-thread processor through a multiplexer, each interface of the multiple interfaces associated with a particular thread_id;

a tag comparator coupled to the multiple interfaces;

wherein the multiple interfaces include a first interface which receives a first fetch request containing the thread_id of the first thread and a first instruction address during a first clock cycle, and a second interface which receives a second fetch request containing the thread_id of the second thread and a second instruction address during a second clock cycle after the first clock cycle, wherein at least the first interface and the second interface are selectively connected for communication with at least the first execution thread and the second execution thread via the multiplexer;

wherein the first interface is configured to receive first response signals comprising a first executable instruction on a third clock cycle when a respective match between the first instruction address and a first tag entry in the tag storage is found, and coupling the first executable instruction to the IF stage during the third clock cycle through the multiplexer;

wherein the second interface is configured to receive second response signals comprising a second executable instruction on a fourth clock cycle when a respective match between the second instruction address and a second tag entry in the tag storage is found, and coupling the second executable instruction to the IF stage during the fourth clock cycle through the multiplexer;

wherein the multiplexer is further configured to send a fetch grant signal to the IF stage in response to the cache controller accepting a request for a desired instruction and a fetch miss signal to the IF stage in response to a desired instruction being unavailable in the data storage.

2. The device of claim 1 where the first instruction address of the first fetch request is defined by a first program counter of the hardware multi-thread microprocessor, and the second instruction address of the second fetch request is defined by a second program counter of the hardware multi-thread microprocessor.

3. The device of claim 1, wherein the multiplexer sends a particular one of the first response signals when the respective match between the first instruction address and the first tag entry in the tag storage is not found, the first response signals indicating a cache miss and cause a request for data to a primary memory.

4. The device of claim 1, wherein the multiplexer sends a particular one of the second response signals when the respective match between the second instruction address and the second tag entry in the tag storage is not found, the second response signals indicating a cache miss and cause a request for data to a primary memory.

5. The device of claim 1, wherein the first interface receives the first instruction address, the respective match between the first instruction address and the first tag entry in the tag storage is not found, and the cache controller asserts a cache busy signal in the first response signals.

6. The device of claim 1 where the data storage further comprises multiple memory banks, wherein a first one of the multiple memory banks has a defined number of rows, each row containing multiple words corresponding to respective program instructions.

7. The device of claim 6 where at least one memory bank of the multiple memory banks is further connected to a first memory device having multiple rows, each one of the multiple rows having a width of 13 bits, wherein a number of the multiple rows is defined by a number of the multiple memory banks and the defined number of rows.

8. The device of claim 7, a first row of the multiple rows comprising a 13-bit tag datum that, in combination with a 4-bit offset datum and a 7-bit index datum, identifies a 24-bit instruction address of a program instruction within a memory bank of the multiple memory banks.

9. The device of claim 7 further connected to a second memory device comprising retention logic that dictates removal of data from the first memory device, the retention logic including pseudo least-recently-used (LRU) logic.

10. A system comprising:

a hardware multi-thread processor executing a plurality of execution threads including at least a first execution thread and a second execution thread, each execution thread having an associated thread identifier (thread_id), the hardware multi-thread processor having a single sequence of pipeline stages, each pipeline stage sending data to a subsequent pipeline stage on each clock cycle, the first pipeline stage being an instruction fetch (IF) stage requesting executable instructions accompanied by a thread_id and an instruction address;

a cache subsystem comprising:

multiple interfaces, each interface of the multiple interfaces associated with a unique thread_id and coupled to a multiplexer;

tag storage having a list of tag entries, each tag entry comprises an association between one of the executable instructions and one of the instruction addresses;

data storage sending executable instructions directly to the multi-thread processor, each executable instruction that the data storage sends to the multi-thread processor being associated with a corresponding tag storage instruction address;

a cache controller coupled to the tag storage, the cache controller comprising a tag comparator and the multiple interfaces;

the multiple interfaces connected to the hardware multi-thread microprocessor, a first interface of the multiple interfaces configured to receive a first fetch request from a first execution thread during a first clock cycle and a second interface of the multiple interfaces configured to receive a second fetch request from a second execution thread during a second clock cycle, wherein at least the first interface and the second interface are selectively connected for communication with at least the first execution thread and the second execution thread via the multiplexer; and the multiplexer configured to send first response signals to the IF stage in response to the first fetch request from the first execution thread during a third clock cycle when a respective match between the first instruction address and a first tag entry in the tag storage is found, the first response signals comprising a first executable instruction, and to send second response signals to the IF stage in response to the second fetch request from the second execution thread during a fourth clock cycle when a respective match between the second instruction address and a second tag entry in the tag storage is found, the second response signals comprising a second executable instruction; and data storage comprising multiple memory banks, wherein a first one of the multiple memory banks has a defined number of rows, each row containing multiple words corresponding to respective program instructions;

wherein the multiplexer is further configured to send a fetch grant signal to the IF stage in response to the cache controller accepting a request for a desired instruction and a fetch miss signal to the IF stage in response to a desired instruction being unavailable in the data storage.

11. The system of claim 10, the data storage further comprising a first memory device having multiple rows, each one of the multiple rows having a width of 13 bits, wherein a number of the multiple rows is defined by a number of the multiple memory banks and the defined number of rows.

12. The system of claim 11, a first row of the multiple rows comprising a 13-bit tag datum that, in combination with a 4-bit offset datum and a 7-bit index datum, identifies a 24-bit instruction address of a program instruction within a memory bank of the multiple memory banks.

13. The system of claim 11, further comprising a second memory device comprising retention logic that dictates removal of data from the first memory device, the retention logic including pseudo least-recently-used (LRU) logic.

14. The system of claim 13, wherein the second memory device comprises 256 rows, each row having a width of 3 bits.

15. A microcontroller unit, comprising:

a hardware multi-thread microprocessor executing a plurality of execution threads including at least a first execution thread and a second execution thread, each execution thread having an associated thread identifier (thread_id), the hardware multi-thread processor having a single sequence of pipeline stages, each pipeline stage sending data to a subsequent pipeline stage on each clock cycle, the first pipeline stage being an instruction fetch (IF) stage requesting executable instructions accompanied by a thread_id and an instruction address;

multiple interfaces, each interface of the multiple interfaces associated with a particular thread_id and connected to the IF stage through a multiplexer, each interface receiving from the IF stage a thread_id and an instruction address;

tag storage having a plurality of entries, each entry stores associations between executable instructions and cached instruction addresses;

data storage sending executable instructions associated with a corresponding tag storage instruction address directly to the multi-thread processor according to a corresponding tag storage instruction address;

the multiple interfaces connected to multiple execution threads of the hardware multi-thread microprocessor, a first interface of the multiple interfaces configured to receive a first fetch request comprising a first instruction address from a first execution thread of the multiple execution threads during a first clock cycle and a second interface of the multiple interfaces configured to receive a second fetch request comprising a second instruction address from a second execution thread of the multiple execution threads during a second clock cycle after the first clock cycle, wherein at least the first interface and the second interface are selectively connected for communication with at least the first execution thread and the second execution thread via the multiplexer;

the multiplexer configured to send first response signals including a first executable instruction to the IF stage in response to the first fetch request from the first execution thread during a third clock cycle when a respective match between the first instruction address and a first tag entry in the tag storage is found and to send second response signals including a second executable instruction in response to the fetch request from the second execution thread during a fourth clock cycle when a respective match between the second instruction address and a second tag entry in the tag storage is found; and a first memory device comprising multiple memory banks, wherein a first one of the multiple memory banks has a defined number of rows, each row containing multiple words corresponding to instruction addresses of respective program instructions;

wherein the multiplexer is further configured to send a fetch grant signal to the IF stage in response to a request for a desired instruction and a fetch miss signal to the IF stage in response to a desired instruction being unavailable in the data storage.

16. The microcontroller unit of claim 15, the first interface configured to further receive the first instruction address of the first fetch request, where the first instruction address is defined by a first program counter of the hardware multi-thread microprocessor, and the second interface is configured to further receive the second instruction address of the second fetch request defined by a second program counter of the hardware multi-thread microprocessor.

17. The microcontroller unit of claim 15, wherein the multiplexer sends a particular one of the first response signals when the respective match between the first instruction address and the first tag entry in the tag storage is not found, the first response signals indicating a cache miss and causes a request for data to a primary memory.

18. The microcontroller unit of claim 15, wherein the multiplexer sends a second particular one of the second response signals when the respective match between the second instruction address and the second tag entry in the tag storage is not found, the second response signals indicating a cache miss and cause a request for data to a primary memory.

19. The microcontroller unit of claim 15, the data storage further comprising a first memory device having multiple rows, each one of the multiple rows having a width of 13 bits, wherein a number of the multiple rows is defined by a number of the multiple memory banks and the defined number of rows.

20. The device of claim 19, wherein a first row of the multiple rows comprising a 13-bit tag datum that, in combination with a 4-bit offset datum and a 7-bit index datum, identifies a 24-bit instruction address of a program instruction within a memory bank of the multiple memory banks.

21. The device of claim 19, further comprising a second memory device comprising retention logic that dictates removal of data from the first memory device, the retention logic including pseudo least-recently-used (LRU) logic.

* * * * *